United States Patent
Liu et al.

(10) Patent No.: US 10,451,720 B2
(45) Date of Patent: Oct. 22, 2019

(54) OBJECT DETECTION APPARATUS AND OBJECT DETECTION METHOD

(71) Applicant: Panasonic Corporation, Osaka (JP)

(72) Inventors: Weijie Liu, Kanagawa (JP); Yoichi Nakagawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 332 days.

(21) Appl. No.: 15/398,315

(22) Filed: Jan. 4, 2017

(65) Prior Publication Data

US 2017/0205501 A1  Jul. 20, 2017

(30) Foreign Application Priority Data

Jan. 19, 2016 (JP) ................................ 2016-007892

(51) Int. Cl.
  G01S 13/04 (2006.01)
  G01S 7/41 (2006.01)
  G01S 13/93 (2006.01)

(52) U.S. Cl.
  CPC .............. G01S 13/04 (2013.01); G01S 7/414 (2013.01); G01S 13/931 (2013.01); *G01S 2013/9332* (2013.01)

(58) Field of Classification Search
  CPC .......... G01S 13/04; G01S 7/292; G01S 7/414; G01S 13/931
  See application file for complete search history.

(56) References Cited

U.S. PATENT DOCUMENTS

| | | | | |
|---|---|---|---|---|
| 5,867,121 A * | 2/1999 | Erickson | ................. | G01S 7/062 342/185 |
| 6,125,191 A * | 9/2000 | Mashimo | ................ | G01S 17/42 340/988 |
| 6,522,289 B1 * | 2/2003 | Frerichs | .................... | G01S 7/24 342/175 |
| 6,677,886 B1 * | 1/2004 | Lok | ......................... | G01S 7/414 342/26 R |
| 7,489,267 B2 * | 2/2009 | Kojima | .................. | G01S 7/064 342/185 |

(Continued)

FOREIGN PATENT DOCUMENTS

JP  2010-266225 A  11/2010

*Primary Examiner* — Peter M Bythrow
(74) *Attorney, Agent, or Firm* — Seed IP Law Group LLP

(57) ABSTRACT

An object detection apparatus includes: capture region extraction circuitry receives measurement information generated by a radar apparatus using reflected waves from each object and uses the measurement information to extract second unit regions as first capture regions from among first unit regions, the first unit regions being regions into which a measuring range of the radar apparatus has been divided, the second unit regions being regions in which each object has been captured; preliminary grouping circuitry that forms a preliminary group including a second capture region that is present within a determined range; feature quantity acquisition circuitry that calculates a feature quantity that represents an association between the preliminary group and the second capture region; discrimination circuitry that discriminates a type of each object that belongs to the second capture region; and object determination circuitry that groups the second capture region according to the type to detect that object.

11 Claims, 8 Drawing Sheets

(56) References Cited

U.S. PATENT DOCUMENTS

| | | | | |
|---|---|---|---|---|
| 8,405,544 B2* | 3/2013 | Nakagawa | G01S 7/023 | 342/146 |
| 8,410,974 B2* | 4/2013 | Kojima | G01S 7/066 | 342/147 |
| 9,513,366 B2* | 12/2016 | Quellec | G01S 7/2926 | |
| 9,594,159 B2* | 3/2017 | Wang | G01S 13/72 | |
| 2005/0264438 A1* | 12/2005 | Fullerton | G01S 13/0209 | 342/28 |
| 2008/0218406 A1* | 9/2008 | Nakanishi | G01S 7/354 | 342/192 |
| 2009/0303234 A1* | 12/2009 | Becker | B60T 7/22 | 345/420 |
| 2010/0156699 A1* | 6/2010 | Kuoch | G01S 7/41 | 342/70 |
| 2010/0207809 A1* | 8/2010 | Fujikawa | G01S 7/414 | 342/26 R |
| 2010/0214151 A1* | 8/2010 | Kojima | G01S 7/414 | 342/28 |
| 2011/0102247 A1* | 5/2011 | Pauli | G01S 7/2927 | 342/159 |
| 2011/0187579 A1* | 8/2011 | Asada | G01S 13/30 | 342/27 |
| 2013/0201054 A1* | 8/2013 | Wang | G01S 13/0218 | 342/93 |
| 2014/0035775 A1* | 2/2014 | Zeng | G01S 13/867 | 342/52 |
| 2014/0043185 A1* | 2/2014 | Quellec | G01S 7/2926 | 342/146 |
| 2015/0061916 A1* | 3/2015 | Sinclair | G01S 13/426 | 342/41 |
| 2015/0061926 A1* | 3/2015 | Ranney | G01S 13/9029 | 342/25 B |
| 2015/0247924 A1* | 9/2015 | Kishigami | G01S 13/931 | 342/70 |
| 2016/0061945 A1* | 3/2016 | Minowa | G01S 13/524 | 342/26 R |
| 2016/0170020 A1* | 6/2016 | Hamada | G01S 13/66 | 342/70 |
| 2016/0203374 A1* | 7/2016 | Zeng | G01S 13/726 | 382/104 |
| 2016/0245911 A1* | 8/2016 | Wang | G01S 13/72 | |
| 2017/0003378 A1* | 1/2017 | Neumann | G01S 7/41 | |
| 2017/0059703 A1* | 3/2017 | Hoare | G01S 13/862 | |

* cited by examiner

OBJECT DETECTION APPARATUS AND OBJECT DETECTION METHOD

BACKGROUND

1. Technical Field

The present disclosure relates to an object detection apparatus and an object detection method that make it possible to, by using a result of a measurement made by a radar apparatus, accurately detect an object that is present in an area around the radar apparatus.

2. Description of the Related Art

In recent years, radar apparatuses have been installed aboard vehicles. Such an on-board radar apparatus detects an object that is present in an area around the vehicle, e.g. another vehicle, a pedestrian, a two-wheel vehicle, or an on-street installation. The on-board radar apparatus detects an object approaching from the front or side of the vehicle and measures the relative positions of the vehicle and the object or the relative velocities of the vehicle and the object. Then, in a case where the on-board radar apparatus has determined, according to a result of the measurement, that there is a possibility of a collision between the vehicle and the object, the on-board radar apparatus gives a warning to the driver or controls the running of the vehicle to avoid the collision.

Further, a system that monitors or manages road traffic by using a radar apparatus installed in an area around a road has been under development. For example, by using a radar apparatus installed in an area around an intersection, such a system detects a vehicle or a pedestrian crossing the intersection or measures traffic flow, thereby adaptively controlling a traffic light. Further, in a case where such a system has determined that there is a possibility of a collision between a vehicle and a pedestrian in a road, the system gives a warning to the driver to avoid the collision.

Further, radar apparatuses are installed, for example, to monitor airports or other facilities. Such a radar apparatus detects an object intruding from the sky or the ground and provides information to a related security system, thereby preventing the intrusion of the object.

Thus, radar apparatuses are used in various scenes to detect objects. A recent radar apparatus has such higher resolution as to be able to acquire radar measurement information on different places from the same object. For this purpose, the radar apparatus performs a grouping (also referred to as "clustering") process on the radar measurement information belonging to the same object and determines an object region. It should be noted that the term "grouping process" means a process in which signals detected at certain intervals of observation are divided into groups and each of the groups (also referred to as "clusters") is defined as an aggregate of signals reflected from a single object.

An example of such a radar apparatus is disclosed in Japanese Unexamined Patent Application Publication No. 2010-266225. Japanese Unexamined Patent Application Publication No. 2010-266225 discloses a technology for performing object detection by extracting a representative point of a local region from radar measurement information of the radar apparatus according to the distance from the radar apparatus, setting an object region range represented by a fixed shape (rectangle) and a direction (inclination) with the representative point as a reference point, choosing, as a member point, radar measurement information within the object region range that is close in reflection intensity to the representative point, and forming a group of the representative point and the associated member point.

However, the technology disclosed in the aforementioned Japanese Unexamined Patent Application Publication No. 2010-266225 determines, according to the reflection intensity, whether radar measurement information (candidates for a member point) within the object region range belongs to the same object as the representative point. This leads to wrong grouping in a case where the reflection intensity from an adjacent different object has been measured to the same extent as the reflection intensity of the representative point. For example, in a case where a pedestrian is located near a vehicle, the reflection intensities of the vehicle and the pedestrian may be measured with approximate values, depending on directions of reflection, although the reflection intensities of the vehicle and the pedestrian with respect to the radar apparatus are supposed to be different. This causes the vehicle and the pedestrian to be grouped into the same group, thus making it difficult for the radar apparatus disclosed in Japanese Unexamined Patent Application Publication No. 2010-266225 to separately detect the pedestrian and the vehicle.

SUMMARY

One non-limiting and exemplary embodiment provides an object detection apparatus and an object detection method that make it possible to separately detect an adjacent different object in detecting an object by performing a grouping process on radar measurement information.

In one general aspect, the techniques disclosed here feature an object detection apparatus including: capture region extraction circuitry, which in operation, receives measurement information generated by one or more radar apparatuses using a plurality of reflected waves from each of a plurality of objects and uses the measurement information to extract a plurality of second unit regions as a plurality of first capture regions from among a plurality of first unit regions, the plurality of first unit regions being regions into which a measuring range of the one or more radar apparatuses has been divided at every determined distance and every determined azimuth angle, the plurality of second unit regions being regions in which each of the plurality of objects has been captured; preliminary grouping circuitry, which in operation, forms a preliminary group including one or more second capture regions that are present within a determined range from each of the plurality of first capture regions; a feature quantity acquirer that calculates, on the basis of the measurement information, feature acquisition circuitry, which in operation, represents an association between the preliminary group and each of the one or more second capture regions; discrimination circuitry, which in operation, discriminates, on the basis of the feature quantity, a type of each of the plurality of objects that belongs to each of the one or more second capture regions; and object determination circuitry, which in operation, groups each of the one or more second capture regions according to the type of each of the plurality of objects to detect each of the plurality of objects.

The present disclosure makes it possible to separately detect an adjacent different object in detecting an object by performing a grouping process on radar measurement information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described in detail below with reference to the drawings.
Embodiment 1

Figure 1:
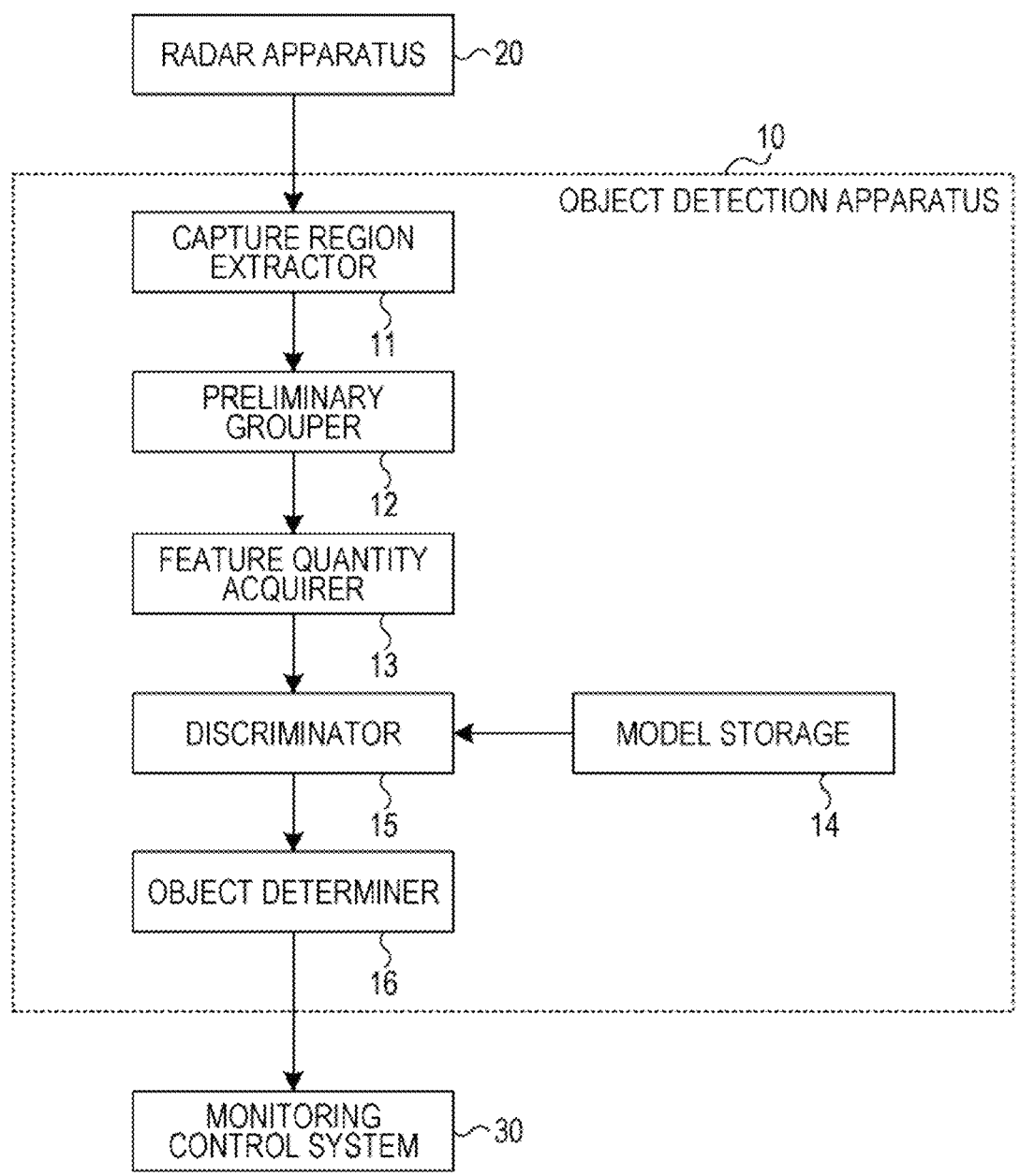
FIG. 1 is a diagram showing a relationship of connection between main components of an object detection apparatus according to Embodiment 1, a radar apparatus, and a monitoring control system.

An object detection apparatus according to Embodiment 1 is described with reference to the drawings. FIG. 1 is a block diagram showing a relationship of connection between main components of an object detection apparatus 10 according to Embodiment 1, a radar apparatus 20, and a monitoring control system 30. In FIG. 1, the object detection apparatus 10 according to Embodiment 1 is connected to the radar apparatus 20 and the monitoring control system 30. The object detection apparatus 10 fulfills part of a radar signal processing function of processing measurement information outputted from the radar apparatus 20, and outputs, to the monitoring control system 30, various types of information obtained by the radar signal processing.

For example, the radar apparatus 20 transmits a radar signal to a measuring range while changing directions of transmission in sequence at determined angular intervals. The radar apparats 20 receives a reflected signal obtained by an object such as an obstacle reflecting the radar signal. Further, the radar apparatus 20 converts the reflected signal into a baseband signal and generates a delay profile (propagation delay characteristics) in each direction of transmission of the radar signal for each of a plurality of unit regions into which the measuring range has been divided. The radar apparatus 20 generates measurement information and outputs it to the object detection apparatus 10.

The monitoring control system 30 acquires information such as the position, velocity, etc. of an object detected by the object detection apparatus 10 processing the measurement information outputted from the radar apparatus 20, and gives a warning, for example, to the driver of the vehicle. Further, in a case where the monitoring control system 30 has determined, according to the position and velocity of the object, that there is a possibility of a collision between the vehicle and the object, the monitoring control system 30 performs a process (accelerator operation, brake operation, or steering wheel operation) for controlling the movement of the vehicle.

The object detection apparatus 10 detects, on the basis of the measurement information outputted from the radar apparatus 20, an object that is present in an area around the vehicle, generates information pertaining to the position and velocity of the object thus detected, and outputs the information to the monitoring control system 30. In the following, a detailed configuration of the object detection apparatus 10, the operation of each of the components, and the like are described in detail.

In FIG. 1, the object detection apparatus 10 includes a capture region extractor 11, a preliminary grouper 12, a feature quantity acquirer 13, a model storage 14, a discriminator 15, and an object determiner 16. Each of the components of the object detection apparatus 10 may be achieved by software or hardware such as an LSI circuit, or may be achieved as part of an electronic control unit (ECU) that controls the vehicle.

The capture region extractor 11 acquires the measurement information from the radar apparatus 20 and, on the basis of the value of each unit region, extracts candidates for a unit region in which the object is present. The measurement information is at least one of a power profile and a Doppler velocity profile.

Figure 2A:
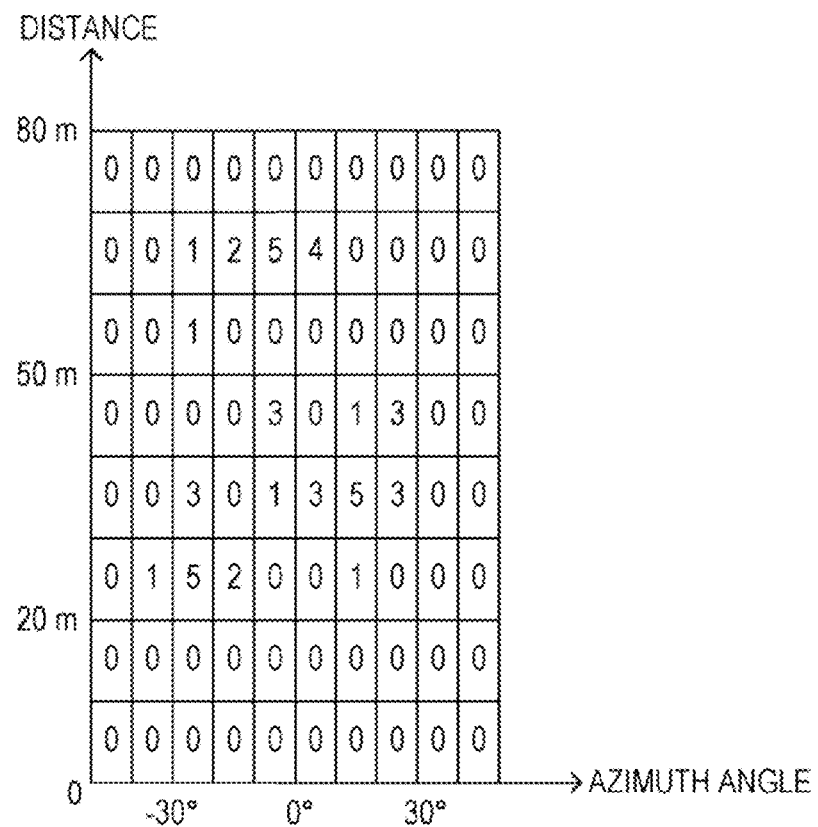
FIG. 2A is a diagram showing a power profile as an example of measurement information.
Figure 2B:
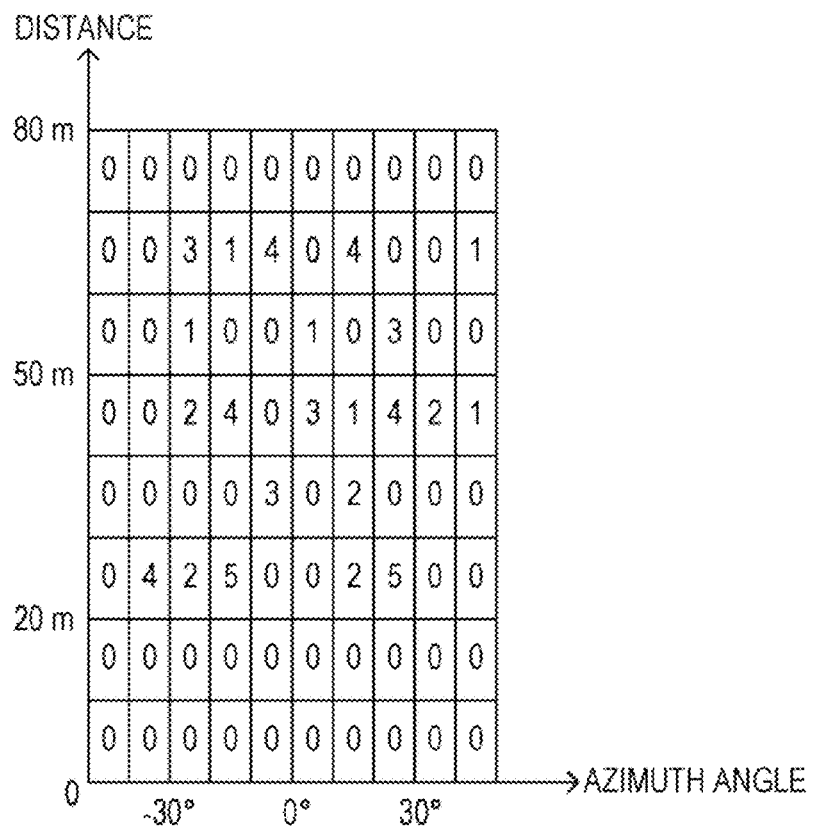
FIG. 2B is a diagram showing a Doppler velocity profile as an example of measurement information.

FIG. 2A is a conceptual diagram showing a power profile as an example of measurement information. FIG. 2B is a conceptual diagram showing a Doppler velocity profile as an example of measurement information. In each of FIGS. 2A and 2B, the horizontal axis represents the azimuth angle of an object with reference to the radar apparatus 20, and the vertical axis represents the distance to the object with reference to the radar apparatus 20. In each of FIGS. 2A and 2B, the unit regions are constituted by dividing the horizontal axis every 10 degrees and dividing the vertical axis every 10 m. In the following, the unit regions are referred to as "cells".

It should be noted that, in the present disclosure, the azimuth angle range and distance range of the cells (unit regions) are not limited to the above ranges. For higher resolution, it is preferable that the cells be smaller in size.

In FIG. 2A, the reflection intensity in each cell is rated on a six-grade scale of levels 0 to 5, and level 5 is highest in reflection intensity. In FIG. 2B, the Doppler velocity in each cell is rated on a six-grade scale of levels 0 to 5, and level 5 is highest in Doppler velocity. It should be noted that, for simplicity of illustration, FIG. 2B shows a positive Doppler velocity as an example for simplicity of illustration, although the Doppler velocity varies in polarity (positive or negative) depending on whether the object is moving toward or away from the radar apparatus 20.

The capture region extractor 11 acquires the measurement information (e.g. the power profile shown in FIG. 2A or the Doppler velocity profile shown in FIG. 2B) from the radar apparatus 20. After that, the capture region extractor 11 extracts "candidates for a cell in which the object is present" from among the plurality of cells. The "candidates for the cell in which the object is present" are cells in which the absolute value of the measurement information (reflection intensity, Doppler velocity) is equal to or greater than a determine threshold. In the following, the "candidates for the cell in which the object is present" are referred to as "capture region", which is used for capturing the object. One capture region may have one or more cells or a plurality of cells.

It should be noted that, for ease of explanation, each of the profiles shown in FIGS. 2A and 2B is exemplified in an orthogonal coordinate system whose coordinate axes represent the azimuth angle and the distance. For this reason, the shape of each of the cells is a rectangle. However, in Embodiment 1, it is desirable that the capture region extractor 11 use a result of a measurement of a polar coordinate system centered at the position of the radar apparatus 20. That is, the shape of the cells is a fan shape. It should be noted that, regardless of the shape of the cells, the following description treats, as a single point, each of the cells of the power profile shown in FIG. 2A and the Doppler velocity profile shown in FIG. 2B.

The preliminary grouper 12 groups capture regions extracted by the capture region extractor 11 and thereby generates a preliminary group for determining a type of each of the capture regions. Specifically, the preliminary grouper 12 forms a preliminary group including at least one capture region (including a capture region to be determined) that is present within a designated range from the target capture region. Unlike a group that is generated by a conventional grouping method, the preliminary group to be generated is not necessarily formed from radar measurement information belonging to the same object.

Figure 3A:
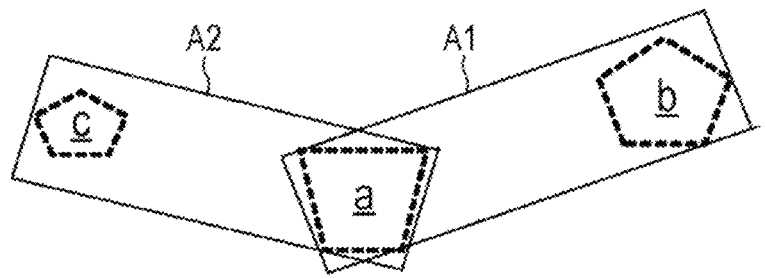
FIG. 3A is a diagram showing an example of generation of a preliminary group according to Embodiment 1.

A method in which the preliminary grouper 12 generates a preliminary group is described with reference to FIG. 3A. FIG. 3A describes a case where the preliminary grouper 12 sets up a preliminary group of a capture region a.

First, the preliminary grouper 12 extracts other capture regions b and c that are present within a designate range from the capture region a. It should be noted that, on the basis of the size of the largest object to be detected by the object detection apparatus 10, the preliminary grouper 12 may set a range within a determined distance from the capture region a to be the designated range. For example, in a case where the largest object to be detected is a five-meter-long car, the designated range is a range within 5 m from the capture region a.

Next, for the capture region b within the designated range, the preliminary grouper 12 sets up a designated shape A1 that surrounds both the capture region a and the capture region b. Similarly, for the capture region c within the designated range, too, the preliminary grouper 12 sets up a designated shape A2 that surrounds both the capture region c and the capture region a. Although the designated shapes may be rectangular or elliptical, the present disclosure does not limit the designated shapes to any particular shapes.

Next, for the designated shapes A1 and A2, the preliminary grouper 12 determines, according to the size of the largest object to be detected, whether to group the designated shapes A1 and A2 into the preliminary group of the capture region a. For example, in a case where it is assumed that the designated shape A1 is a single target object, the preliminary grouper 12 determines whether the size of the designated shape A1 falls within the range of the size of the largest object to be detected.

In a case where the size of the designated shape A1 falls within the range of the size of the largest object to be detected, the preliminary grouper 12 determines the designated shape A1 as part of the preliminary group of the capture region a. On the other hand, in a case where the size of the designated shape A1 falls outside the range of the size of the largest object to be detected, the preliminary grouper 12 excludes the designated shape A1 from the preliminary group of the capture region a.

The preliminary grouper 12 processes the designated shape A2 in a manner similar to the designated shape A1. For example, in a case where both the designated shape A1 and the designated shape A2 fall within the range of the size of the largest object to be detected, the preliminary group of the capture region a is constituted using the designated shape A1 and the designated shape A2.

The process for generating a preliminary group shown in FIG. 3A can be more easily achieved. For example, in a case where the radar measurement information is expressed by the azimuth angle and the distance, the preliminary grouper 12 forms a single fan-shaped designated shape using the respective minimum and maximum azimuth angles and minimum and maximum distances of the capture regions a and b. In a case where the size of the single fan-shaped designated shape falls within the range of the size of the largest object to be detected, the preliminary grouper 12 determines the capture region b as part of the preliminary group of the capture region a.

In FIG. 1, the feature quantity acquirer 13 calculates a feature quantity of a preliminary group and a feature quantity of a capture region within the preliminary group on the basis of measurement information. The present disclosure does not limit the feature quantities to any specific values. For example, the feature quantity acquirer 13 needs only calculate at least one of the following three types of feature quantity:

(1) Capture Region Feature

A feature quantity based on a capture region feature is calculated by utilizing features associated with the size, reflected power, and Doppler velocity of each capture region within a preliminary group. For example, the feature of the size is the azimuth width, distance width, or area of the capture region. The feature of the reflected power is for example the maximum value, average value, or dispersion of the reflected power. The feature of the Doppler velocity is for example, the maximum value, average value, or dispersion of the Doppler velocity. That is, the capture region feature is a feature quantity of the capture region alone.

(2) Comparative Feature

A feature quantity based on a comparative feature is calculated by utilizing a feature associated with a comparison of position or size between a preliminary group and a capture region within the preliminary group. For example, the comparative feature of position is the difference in center azimuth value or center distance value between the capture region and the preliminary group. The comparative feature of size is the ratio of azimuth width or distance width between the capture region and the preliminary group. That is, the comparative feature is a feature quantity that represents a relationship between the preliminary group and the capture region within the preliminary group.

(3) Neighborhood Feature

A feature quantity based on a neighborhood feature is calculated by utilizing a feature of a neighborhood of a capture region within a preliminary group. For example, in addition to a feature quantity of the capture region, the feature quantity acquirer 13 calculates a feature quantity of another capture region within a neighboring region. The neighboring region is an area of a designated size that neighbors the capture region within the preliminary group in terms of azimuth or distance. However, the neighboring region is confined into the preliminary group. For example, the feature quantity acquirer 13 may set an area of equal size of the capture region as the neighboring region on the left or right side of the capture region and utilize a feature associated with the reflected power or Doppler velocity of a capture region within the neighboring area. However, in a case where it is difficult to set the neighboring region, the feature quantity acquirer 13 calculates feature quantities of the capture region and the preliminary group as "none", i.e., 0. That is, the neighborhood feature is a feature quantity that represents a relationship between the capture region and an area around the capture region.

The model storage 14 extracts feature quantities of the capture regions of each separate type of target object as acquired in advance and the preliminary group and generates an identification model by modeling the target object according to the feature quantities. The model storage 14 stores in advance the identification model thus generated. In the present disclosure, a specific method for generating an identification model of a target object that is stored in the model storage 14 is not limited to any particular method. Examples of an identification technique that the model storage 14 can utilize include an analysis technique for directly discriminating a target object according to the characteristics of distribution of feature quantities, a mechanical learning technique (e.g. a support vector machine technique) based on teacher data, a deep learning technique including automatic extraction of feature quantities, and the like. The model storage 14 generates a corresponding identification model according to the identification technique.

On the basis of the feature quantities acquired by the feature quantity acquirer 13, the discriminator 15 discriminates, for each of the capture regions within the preliminary group, a type of object to which the capture region belongs. For example, the discriminator 15 makes a comparison (matching) between the feature quantities acquired by the feature quantity acquirer 13 and the identification model stored in the model storage 14 and determines which type of target object a capture region within the preliminary group belongs to.

Figure 3B:
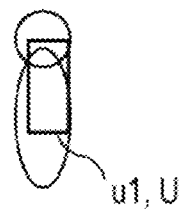
FIG. 3B is a diagram showing an example of generation of a preliminary group according to Embodiment 1.
Figure 3C:
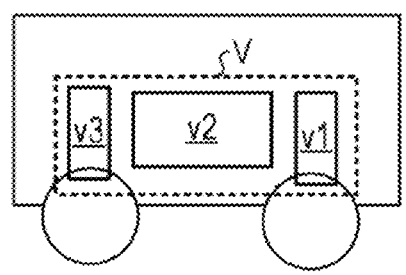
FIG. 3C is a diagram showing an example of generation of a preliminary group according to Embodiment 1.
Figure 3D:
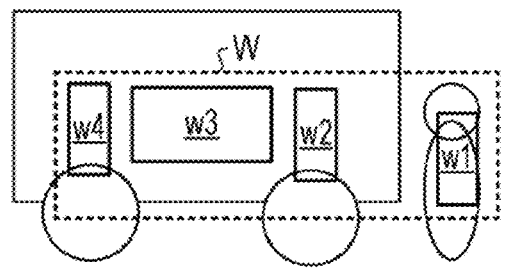
FIG. 3D is a diagram showing an example of generation of a preliminary group according to Embodiment 1.

Examples of methods for discrimination by the discriminator 15 are described with reference to FIGS. 3B to 3D. FIGS. 3B to 3D show examples of generation of preliminary groups for each separate type of target object. For example, the model storage 14 stores identification models that correspond to the preliminary groups shown in FIGS. 3B to 3D, respectively.

FIG. 3B shows an example of a pedestrian alone. FIG. 3B shows a single capture region u1. Since there is no other capture region around the capture region u1, a preliminary group U of the capture region u1 has an area of the same size as the capture region u1. In FIG. 3B, the discriminator 15 for example uses the capture region feature (feature quantity (1)) to discriminate a type of object to which the capture region u1 belongs.

FIG. 3C shows an example of a vehicle alone. FIG. 3C shows three capture regions v1, v2, and v3. As an example, the capture region v1 is a target to be discriminated. In FIG. 3C, a preliminary group V of the capture region v1 includes the capture regions v2 and v3. The capture regions v2 and v3 affect the position and size of the preliminary group V and therefore also affect the comparative feature (feature quantity (2)) and the neighborhood feature (feature quantity (3)) of the capture region v1.

A case is described where the capture region u1 shown in FIG. 3B and the capture region v1 shown in FIG. 3C have the same capture region features (feature quantities (1)). Note here that the preliminary group U and the preliminary group V have areas of different sizes and different capture regions included therein and therefore have different comparative features (feature quantities (2)) or neighborhood features (feature quantities (3)).

Therefore, the discriminator 15 makes a comparison between the feature quantities and the identification model for each preliminary group and discriminates types of object to which each separate capture region belongs. This allows the discriminator 15 to distinguish between the capture region u1 and the capture region v1. That is, the discriminator 15 can distinguish between the capture region u1 and the capture region v1 on a preliminary-group-by-preliminary-group basis while having difficulty in distinguishing between the capture region u1 and the capture region v1 on a capture region-by-capture region basis, as the capture region u1 and the capture region v1 have the same capture region features.

FIG. 3D shows an example in which a vehicle and a pedestrian are concurrently present. FIG. 3D shows four capture regions w1, w2, w3, and w4. The four capture regions w1, w2, w3, and w4 belong to a preliminary group W.

A case is described where the capture region w1 based on the pedestrian and the capture region w2 based on the vehicle have the same capture region features (feature quantities (1)). Note here that the capture region w1 and the capture region w2 differ in position and other nearby regions within the preliminary group W and therefore have different comparative features (feature quantities (2)) of each of the capture regions w1 and w2 and the preliminary group W and different neighborhood features (feature quantities) of each of the capture regions w1 and w2.

Therefore, by making a comparison between each of the feature quantities (comparative features and neighborhood features) within the preliminary group and the identification model and discriminating types of object to which each separate capture region belongs, the discriminator 15 can distinguish between the capture region w1 and the capture region w2. That is, the discriminator 15 can distinguish between the capture region w1 and the capture region w2 on a preliminary-group-by-preliminary-group basis while having difficulty in distinguishing between the capture region w1 and the capture region w2 on a capture region-by-capture region basis, as the capture region w1 and the capture region w2 have the same capture region features.

Further, while the capture region w2 of FIG. 3D and the capture region v1 of FIG. 3C correspond to the same site of the vehicle, the preliminary group W to which the capture region w2 belongs and the preliminary group V to which the capture region v1 belong have different comparative features (feature quantities (2)) and neighborhood features (feature quantities (3)). For this reason, the discriminator 15 yields different results depending on identification models stored in the model storage 14. That is, in a case where the model storage 14 stores in advance both an identification model (FIG. 3C) of a vehicle alone and an identification model (FIG. 3D) in which a vehicle and a pedestrian are concurrently present, the discriminator 15 can discriminate each of the capture regions w2 and v1 as a capture region of the vehicle.

The object determiner 16 determines a type of target object and a region of the target object on the basis of results of discrimination of all capture regions in a preliminary group. That is, the object determiner 16 groups the capture regions for each separate type of object and detects one or more objects. Further, the object determiner 16 determines, as an object region, the total of capture regions (all capture regions) belonging to each separate object. It should be noted that in a case where the distance between each of capture regions has a determined or larger value, the object determiner 16 may determine that these capture regions belong to the same type of object or determine that these capture regions belong to different types of object. Furthermore, the object determiner 16 may determine the velocity of an object from the features of capture regions belonging to the object and output the velocity of the object thus determined.

As described above, by utilizing the features of plural pieces of radar measurement information measured by the radar apparatus 20, the object detection apparatus 10 according to Embodiment 1 can accurately detect an object even in a case where it is difficult to detect an object by utilizing a single piece of radar measurement information. There are two points of difference between Embodiment 1 and the conventional technology. One of the points of difference is the order of execution of grouping, and the other point of difference is model information.

The conventional technology has performed grouping of capture regions on the basis of a coincidence of feature (e.g. reflection intensity) between each of the capture regions without regard for object type. However, a radar apparatus may experience a coincidence of pieces of radar measurement information from different objects depending on directions of reflection and may not experience a coincidence of pieces of radar measurement information from the same object. For this reason, the conventional technology has had difficulty in accurately grouping capture regions of the same object.

On the other hand, Embodiment 1 allows the object detection apparatus 10 to form a preliminary group for each capture region regardless of whether the capture regions belong to the same object and, on the basis of features within the preliminary group, discriminate types of object to which each separate capture region belongs. That is, for the capture region to be discriminated, the object detection apparatus 10 uses features in a preliminary group including the capture region, as well as a feature of the capture region. In other words, the object detection apparatus 10 considers the co-occurrence characteristics of a capture region with surrounding capture regions. For this reason, even if a feature of a single capture region coincides with a feature of a certain type of object, the object detection apparatus 10 does not utilize the individual feature of the single capture region in a process of discrimination of the object in a case where features of capture regions surrounding the single capture region within a preliminary group are different from the feature of the certain type of object. That is, the object detection apparatus 10 can improve the accuracy of discrimination of a type of object with combined use of features of a capture region and capture regions surrounding the capture region and can accurately group one or more capture region of the same object.

Further, as for model information, the conventional technology generates models for each separate type of object. However, in a case where an object is measured by a radar apparatus, the number and positions of sites of measurement randomly vary with time. Therefore, it has been difficult to analytically express a feature of an object that as extracted from radar measurement information of the radar apparatus. For this reason, in generating a model of an object, the conventional technology has utilized a model of mechanical learning (e.g. support vector machine) with premeasured data as teacher data. However, in the conventional technology, a model of an object that can be utilized is a model corresponding to an object that is formed by grouping capture regions. For this reason, it is difficult for the conventional technology to accurately perform object detection with a model of an object unless grouping of capture regions is properly performed.

On the other hand, in Embodiment 1, radar measurement information of an individual object is combined with radar measurement information of a nearby different object (that is, a preliminary group is formed), and the combined radar measurement information is utilized as teacher data. That is, the object detection apparatus 10 can improve the accuracy of discrimination with respect to radar measurement information by utilizing a model including not only the capture region to be discriminated but also capture regions surrounding the capture region to be discriminated. That is, because of the improvement in accuracy of discrimination for each capture region before a grouping process (i.e. in a preliminary group), the object detection apparatus 10 can properly perform grouping of the capture regions. It should be noted that, in Embodiment 1, since the object detection apparatus 10 performs discrimination on a capture region-by-capture region basis before the grouping process, the object detection apparatus 10 does not require grouping at the time of matching with a model in the discrimination process.

With such a configuration, the object detection apparatus 10 according to Embodiment 1 can separately detect an adjacent different object in detecting an object by grouping radar measurement information.

Embodiment 2

Figure 4:
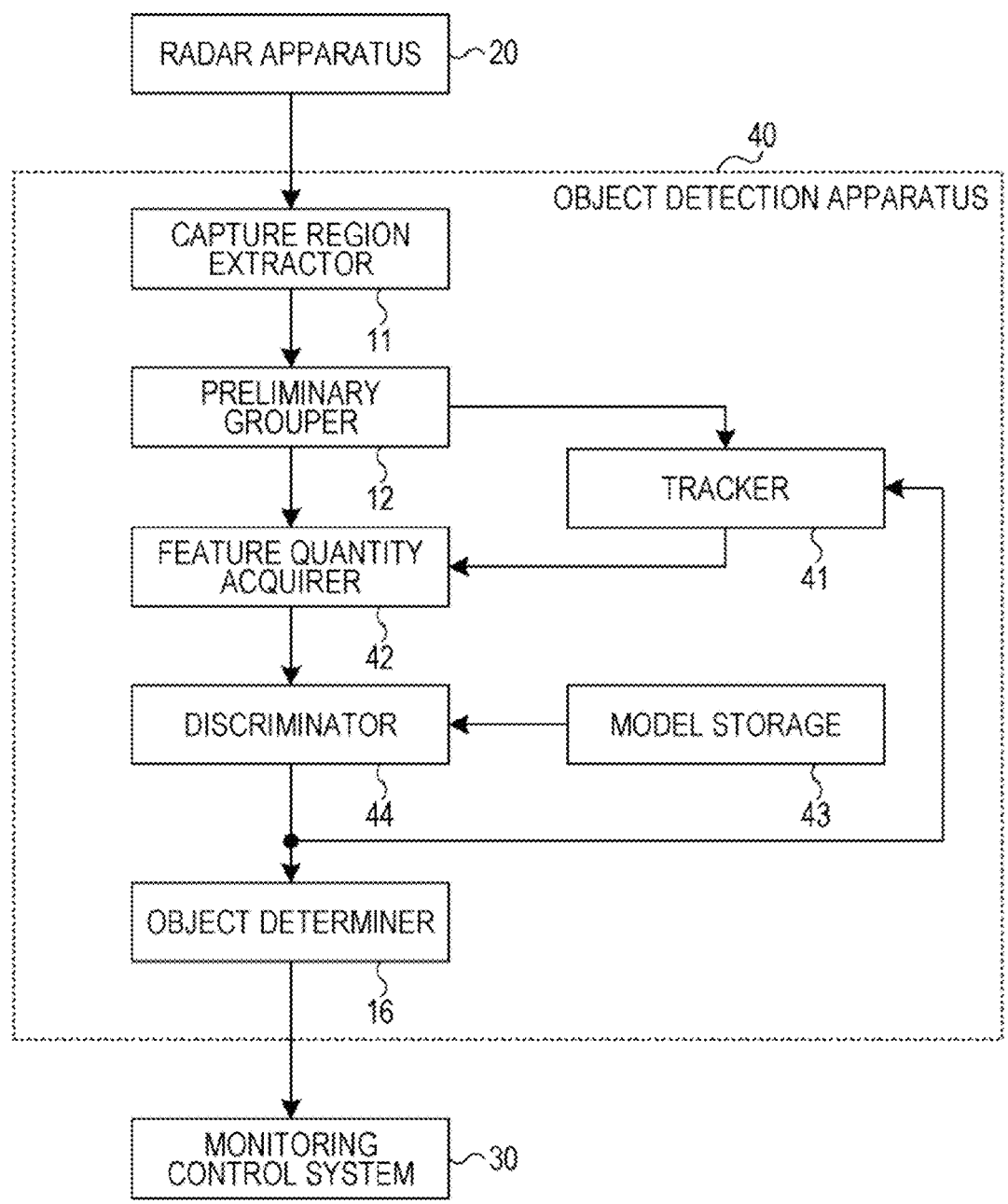
FIG. 4 is a diagram showing a relationship of connection between main components of an object detection apparatus according to Embodiment 2, a radar apparatus, and a monitoring control system.

FIG. 4 is a block diagram showing a relationship of connection between main components of an object detection apparatus 40 according to Embodiment 2, a radar apparatus 20, and a monitoring control system 30. Components shown in FIG. 4 that are the same as those shown in FIG. 1 are given the same reference numerals, and as such, are not described in detail below. In comparison with the object detection apparatus 10 according to Embodiment 1, the object detection apparatus 40 shown in FIG. 4 further includes a tracker 41. Further, the object detection apparatus 40 includes a feature quantity acquirer 42, a model storage 43, and a discriminator 44 that perform different operations from the feature quantity acquirer 13, the model storage 14, and the discriminator 15 of the object detection apparatus 10 according to Embodiment 1.

The tracker 41 receives, from the discriminator 44, a result of discrimination of a type of object with respect to a preliminary group of a previous frame (previous frame information) and, on the basis of the result of discrimination, performs a tracking process for a preliminary group (preliminary group of a current frame) calculated by the preliminary grouper 12. That is, the tracker 41 determines the preliminary group of the current frame that corresponds to the preliminary group of the previous frame. It should be noted that the tracking process in the tracker 41 is not limited to any method. Further, as a range of search in the current frame for a preliminary group corresponding to that of the previous frame, a range of proximity to the position of the preliminary group of the previous frame (e.g. a range within a determined distance from the position of the preliminary group of the previous frame) may be set.

The feature quantity acquirer 42 acquires a feature quantity on the basis of a result of tracking performed by the tracker 41. For example, in addition to the feature quantities (1) to (3) that are acquired by the feature quantity acquirer 13 according to Embodiment 1, the feature quantity acquirer 42 acquires the following feature quantity (4):

(4) Inter-frame Variation Feature

A feature quantity based on an inter-frame variation feature is calculated by utilizing a variation feature between a preliminary group of a previous frame and a group of a current frame that corresponds to the preliminary group of the previous frame. For example, the inter-frame variation feature is a variation in size of the same preliminary group between the previous frame and the current frame, a variation in the number of capture regions possessed by the same preliminary group between the previous frame and the current frame, or a variation in position distribution of capture regions in the same preliminary group between the previous frame and the current frame. That is, the inter-frame variation feature is a feature quantity that represents a time change in preliminary group and capture region.

The model storage 43 acquires in advance an inter-frame variation feature in addition to the feature quantities that are acquired by the feature quantity acquirer 13 according to Embodiment 1, and stores these feature quantities as an identification model.

The discriminator 44 discriminates a capture region within a preliminary group by utilizing the inter-frame variation feature (feature quantity (4)) in addition to the feature quantities (1) to (3). Further, the discriminator 44 outputs a result of discrimination to the tracker 41 as previous frame information for use in a tracking process.

Object sites corresponding to radar measurement information randomly vary with time (i.e. frame). That is, the number and positions of capture regions vary with time. Therefore, the conventional technology has had difficulty in tracking capture regions across a plurality of frames. Meanwhile, there are a large number of technologies for tracking an object after determining it. However, in the conventional technology, tracking is premised on the determination of an object. That is, the conventional technology has had difficulty in utilizing a result of tracking in order to determine an object.

On the other hand, the object detection apparatus 40 according to Embodiment 2 can group (aggregate) radar measurement information as a preliminary group and track the preliminary group across a plurality of frames. This allows the object detection apparatus 40 to improve the performance of object discrimination, as features tracked across the plurality of frames are utilized in the object discrimination. For example, in a case where a pedestrian is present near a vehicle and there is a time variation between sites of radar measurement information from the vehicle, the object detection apparatus 40 can track changes in positional relationship between radar measurement information from the pedestrian and the radar measurement information from the vehicle and can therefore separately detect the pedestrian and the vehicle on the basis of the changes in positional relationship.

Embodiment 3

Figure 5:
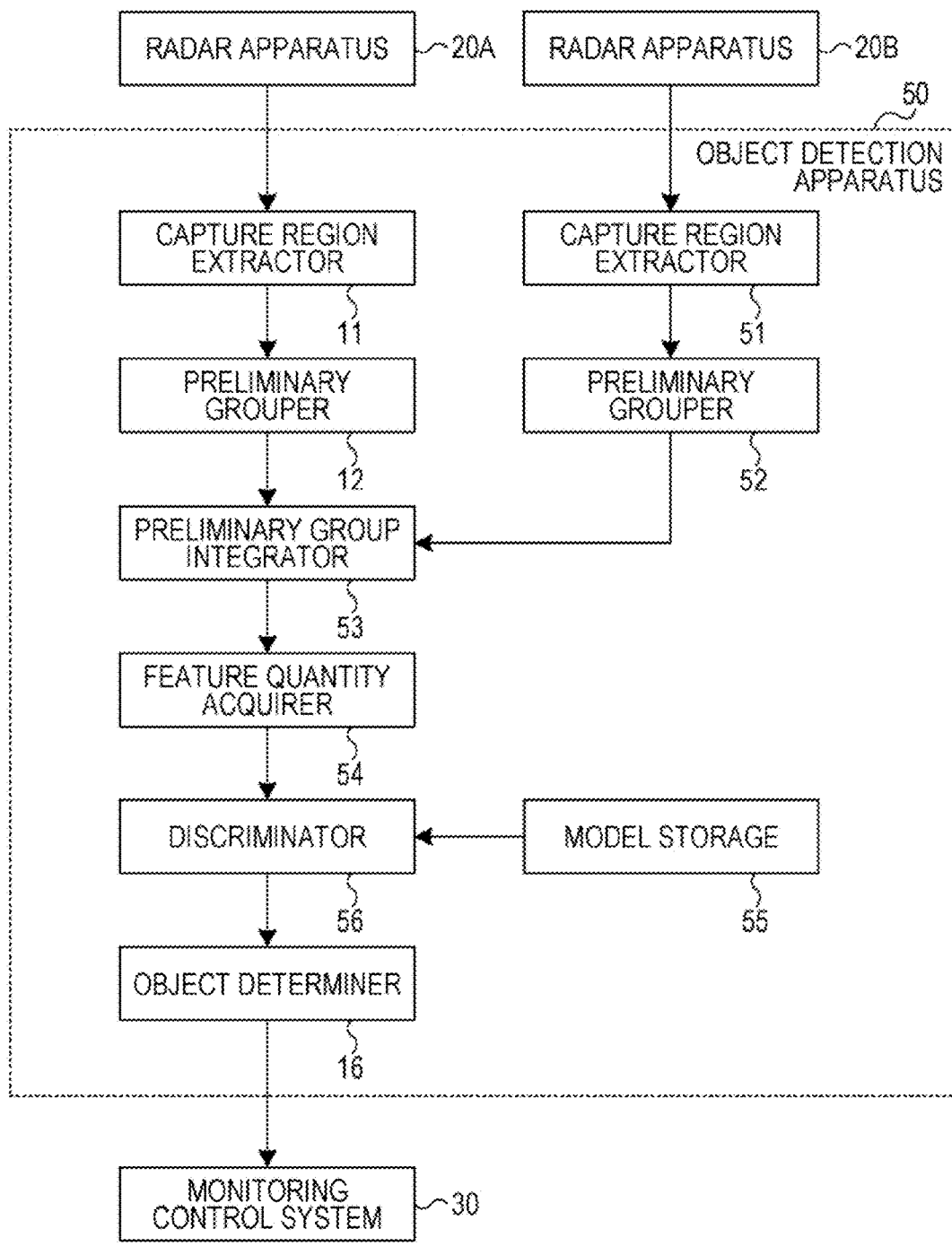
FIG. 5 is a diagram showing a relationship of connection between main components of an object detection apparatus according to Embodiment 3, radar apparatuses, and a monitoring control system.

FIG. 5 is a block diagram showing a relationship of connection between main components of an object detection apparatus 50 according to Embodiment 3, two radar apparatuses 20A and 20B, and a monitoring control system 30. Components shown in FIG. 5 that are the same as those shown in FIG. 1 are given the same reference numerals, and as such, are not described in detail below. The object detection apparatus 50 according to Embodiment 3 includes two capture region extractors 11 and 51 and two preliminary groupers 12 and 52. Further, the object detection apparatus 50 includes a preliminary group integrator 53. Further, the object detection apparatus 50 includes a feature quantity acquirer 54, a model storage 55, and a discriminator 56 that perform different operations from the feature quantity acquirer 13, the model storage 14, and the discriminator 15 of the object detection apparatus 10 according to Embodiment 1.

The capture region extractor 51 acquires measurement information from the radar apparatus 20B and, in a manner similar to the capture region extractor 11, extracts candidates for a unit region corresponding to an object on the basis of the value of each unit region.

In a manner similar to the preliminary grouper 12, the preliminary grouper 52 groups capture regions extracted by the capture region extractor 51 and thereby generates a preliminary group for determining a type of each of the capture regions.

That is, the preliminary grouper 12 forms a preliminary group for the radar apparatus 20A, and the preliminary grouper 52 forms a preliminary group for the radar apparatus 20B.

The preliminary group integrator 53 unifies space coordinates of the radar apparatuses 20A and 20B and integrates the preliminary group of the radar apparatus 20A and the preliminary group of the radar apparatus 20B on the unified coordinate system.

A process in the preliminary group integrator 53 is described in detail with reference to FIG. 6.

Figure 6:
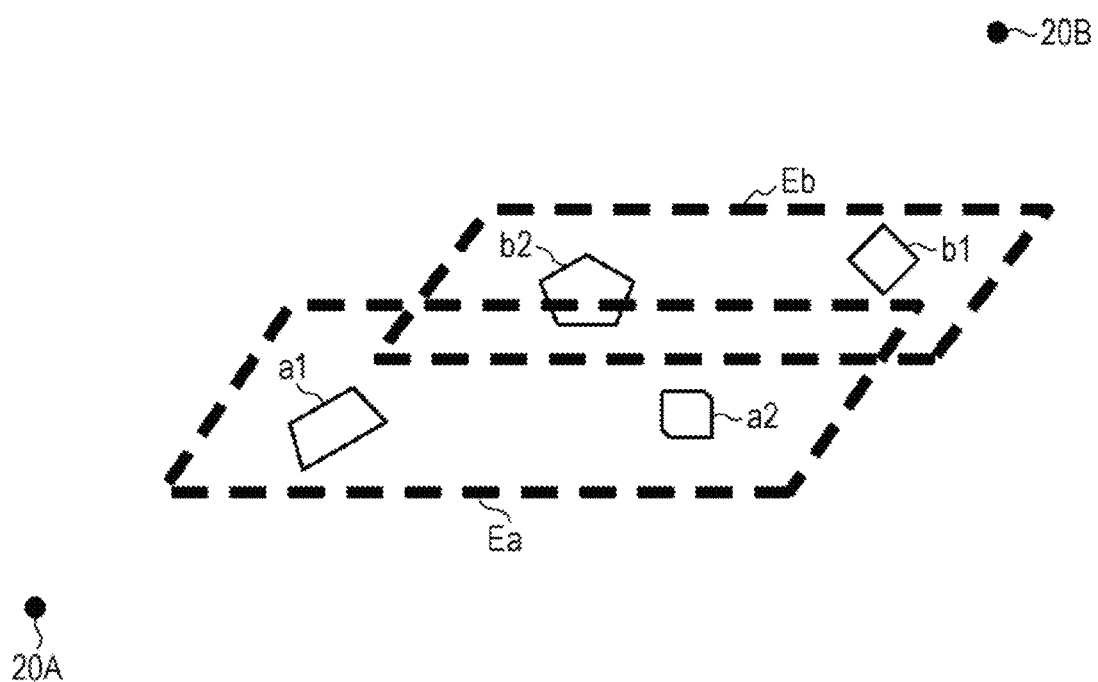
FIG. 6 is a diagram showing an example of an integrated coordinate system according to Embodiment 3.

FIG. 6 shows the radar apparatus 20A, the radar apparatus 20B, a single preliminary group Ea of the radar apparatus 20A, and a single preliminary group Eb of the radar apparatus 20B. In searching for the preliminary group Eb, the preliminary group integrator 53 may search for a preliminary group at the shortest distance from the preliminary group Ea as the preliminary group Eb from among preliminary groups of the radar apparatus 20B in a designated range for the preliminary group Ea. The designated range for the preliminary group Ea may be set on the basis of the size of the largest object to be detected. Further, the preliminary group integrator 53 may consider the dimensions of the preliminary group Ea in searching for the preliminary group Eb. Further, the preliminary group integrator 53 may associate a plurality of preliminary groups with the single preliminary group Ea.

For example, the feature quantity acquirer 54 forms, as a new preliminary group (hereinafter referred to as "integrated preliminary group"), an integrated region including the preliminary groups Ea and Eb shown in FIG. 6. The feature quantity acquirer 54 sets, as capture regions belonging to the integrated preliminary group, capture regions a1 and a2 belonging to the radar apparatus 20A and capture regions b1 and b2 belonging to the radar apparatus 20B, and acquires a feature quantity of each of the capture regions.

The model storage 55 extracts, in the integrated preliminary group, feature quantities of the capture regions of each separate type of target object as acquired in advance and the integrated preliminary group, generates an identification model by modeling the target object according to the feature quantities, and stores the identification model.

The discriminator 56 makes a matching between each of the feature quantities acquired by the feature quantity acquirer 54 and the identification model stored in the model storage 55 and determines which type of target object a capture region within the integrated preliminary group belongs to.

As described above, in the object detection apparatus 50 according to Embodiment 4, the capture region extractors 11 and 51 extract capture regions on the basis of measurement information acquired from the two radar apparatuses 20A and 20B, respectively. Then, the preliminary groupers 12 and 52 form preliminary groups with respect to the two radar apparatuses 20A and 20B, respectively. Then, the preliminary group integrator 53 generates an integrated preliminary group with respect to the preliminary groups of the plurality of radar apparatuses 20A and 20B. The discriminator 56 discriminates each capture region using feature quantities of a plurality of capture regions within the integrated preliminary group. That is, the object detection apparatus 50 can utilize co-occurrence characteristics between pieces of radar measurement information of the plurality of radar apparatuses 20A and 20B.

According to Embodiment 4, the use of the plurality of radar apparatuses 20A and 20B makes it possible to use object information contained in plural pieces of radar measurement information rather than a single piece of radar measurement information, thus improving the accuracy of object detection.

It should be noted that although FIG. 6 takes as an example the plurality of radar apparatuses 20A and 20B installed opposite each other, Embodiment 4 is also applicable to a plurality of radar apparatuses that perform measurements in the same direction, as in the case of an on-board radar. The number of radar apparatuses that are installed is not limited to 2, and three or more radar apparatuses may be used.

Embodiment 4

Figure 7:
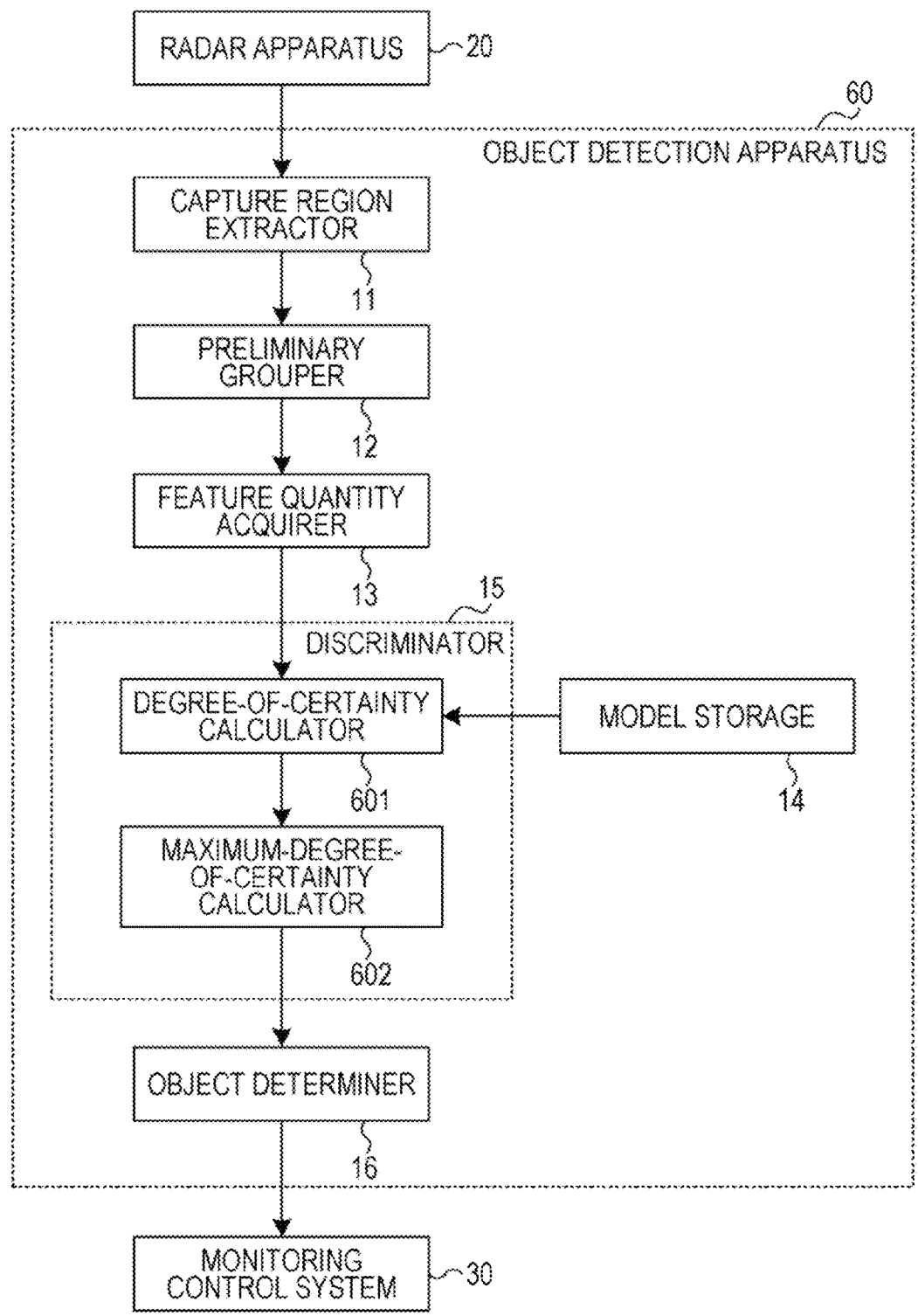
FIG. 7 is a diagram showing a relationship of connection between main components of an object detection apparatus according to Embodiment 4, a radar apparatus, and a monitoring control system.

FIG. 7 is a block diagram showing a relationship of connection between main components of an object detection apparatus 60 according to Embodiment 4, a radar apparatus 20, and a monitoring control system 30. Components shown in FIG. 7 that are the same as those shown in FIG. 1 are given the same reference numerals, and as such, are not described in detail below. The object detection apparatus 60 according to Embodiment 4 includes a degree-of-certainty calculator 601 and a maximum-degree-of-certainty calculator 602 as internal components of the discriminator 15.

The degree-of-certainty calculator 601 calculates a degree (degree of certainty) to which each capture region within a preliminary group belongs to each separate candidate for an object to be detected, instead of making a two-valued determination as to whether each capture region within a preliminary group belongs the designated object to be detected. For example, the degree-of-certainty calculator 601 calculates a degree of coincidence by comparing a feature quantity of a capture region with an identification model stored in the model storage 14 and sets the degree of coincidence as a degree of certainty.

Figure 8A:
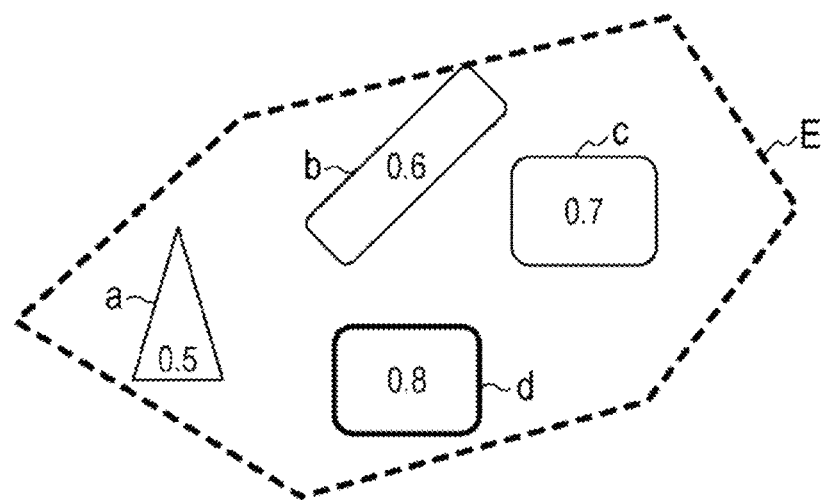
FIG. 8A is a diagram showing examples of degrees of certainty with respect to a vehicle according to Embodiment 4.
Figure 8B:
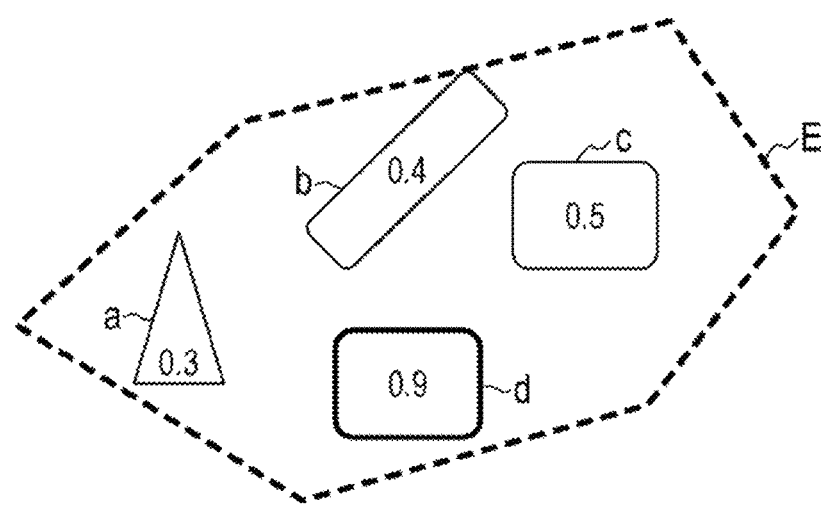
FIG. 8B is a diagram showing examples of degrees of certainty with respect to a pedestrian according to Embodiment 4.

FIGS. 8A and 8B each show an example of a process in which the degree-of-certainty calculator 601 calculates degrees of certainty.

FIGS. 8A and 8B show capture regions a, b, c, and d and a preliminary group E. FIG. 8A shows the respective degrees of certainty of the capture regions with respect to a vehicle, and FIG. 8B shows the respective degrees of certainty of the capture regions with respect to a pedestrian.

On the basis of the maximum degree of certainty of the degrees of certainty calculated by the degree-of-certainty calculator 601 for each separate capture region, the maximum-degree-of-certainty calculator 602 discriminates a type of object to which the capture region belongs. That is, the maximum-degree-of-certainty calculator 602 determines that the capture region belongs to the candidate for the object to be detected with the maximum degree of certainty. The capture regions are classified as target objects with the highest degrees of certainty. For example, in FIGS. 8A and 8B, the maximum-degree-of-certainty calculator 602 classifies the capture region d (with a maximum degree of certainty of 0.9 with respect to the pedestrian) as the pedestrian and classifies the capture regions a to c (with maximum degrees of certainty pf 0.5, 0.6, and 0.7 with respect to the vehicle) as the vehicle.

It should be noted that in a case where degrees of certainty with respect to objects in a capture region are about the same, the maximum-degree-of-certainty calculator 602 may temporarily suspend the discrimination and make a final discrimination by utilizing additional information.

For example, since, in FIGS. 8A and 8B, the capture region d is high in both the degree of certainty with respect to the pedestrian (maximum degree of certainty of 0.9) and the degree of certainty with respect to the vehicle (maximum degree of certainty of 0.8), the maximum-degree-of-certainty calculator 602 temporarily suspends the discrimination of an object and utilizes shape information of the preliminary group as additional information.

That is, in classifying the capture region d as the vehicle, the maximum-degree-of-certainty calculator 602 forms the vehicle with the four capture regions a, b, c, and d, and in classifying the capture region d as the pedestrian, the maximum-degree-of-certainty calculator 602 forms the pedestrian with the three capture regions a, b, and c. Next, the maximum-degree-of-certainty calculator 602 compares the shape of the preliminary group, which is additional information, with the shape of the vehicle (the capture regions a, b, c, and d or the capture regions a, b, and c). Note here that since the maximum-degree-of-certainty calculator 602 has determined that the shape formed by the three capture regions a, b, and d is close to the shape of the vehicle, the maximum-degree-of-certainty calculator 602 classifies the capture region d as the pedestrian.

It should be noted that examples of other additional information may include tracking information of the preliminary group, information from a plurality of radar apparatuses, and the like. However, in a case where it is difficult to guarantee continuity of capture regions, the maximum-degree-of-certainty calculator 602 may for example utilize a degree of certainty of presence of a vehicle or a pedestrian as reserved information.

As described above, Embodiment 4 allows the object detection apparatus 60 to discriminate an object by accumulating uncertain information even in a case where there is no sufficient information to discriminate an object.

In the foregoing, embodiments of the present disclosure have been described.

These embodiments are mere examples of object detection apparatuses of the present disclosure and may be subjected to various modifications. Further, the embodiments described above may be combined as appropriate. For example the tracker 41 described in Embodiment 2 may be added to the object detection apparatus 60 according to Embodiment 4.

Further, an object detection apparatus of the present disclosure may be connected to a radar apparatus installed aboard a vehicle. In a case where the object detection apparatus of the present disclosure has determined that there is a possibility of a collision between the vehicle and an object, the object detection apparatus of the present disclosure can give a warning to the driver or control the running of the vehicle to avoid the collision. Further, in order to accurately detect a vehicle, a two-wheel vehicle, a pedestrian, and the like that are present in an area around a road including an intersection, the object detection apparatus of the present disclosure may be connected to a radar apparatus installed in the area around the road. In a case where the radar apparatus is installed in the area around the road, the prediction of a possibility of a collision of a vehicle, a two-wheel vehicle, a pedestrian, and the like at the intersection or the like, the avoidance of the collision, and the grasping and management of traffic can be performed. As a result, the object detection apparatus of the present disclosure can prevent traffic accidents and achieve efficient traffic management. Alternatively, the object detection apparatus of the present disclosure may be connected to a radar apparatus that monitors an airport, a building, a facility, or the like, for example. The object detection apparatus of the present disclosure can ensure the safety of the facility because the object detection apparatus of the present disclosure can accurately detect a small flying object, a bird, an intruder, or the like, for example.

Although each of the above embodiments has been described by taking as an example a case where the present disclosure can be realized by software, hardware, or software in cooperation with hardware.

Further, each functional block used in the description of each embodiment described above can be partly or entirely realized by an LSI such as an integrated circuit, and each process described in the each embodiment may be controlled partly or entirely by the same LSI or a combination of LSTs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor.

Further, in addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

Furthermore, if future integrated circuit technology replaces LSTs as a result of the advancement of semiconductor technology or other derivative technology, the functional blocks could be integrated using the future integrated circuit technology. Biotechnology can also be applied.

Various aspects of the embodiments according to the present disclosure encompass the following:

An object detection apparatus according to a first aspect of the present disclosure includes: capture region extraction circuitry, which in operation, receives measurement information generated by one or more radar apparatuses using a plurality of reflected waves from each of a plurality of objects and uses the measurement information to extract a plurality of second unit regions as a plurality of first capture regions from among a plurality of first unit regions, the plurality of first unit regions being regions into which a measuring range of the one or more radar apparatuses has been divided at every determined distance and every determined azimuth angle, the plurality of second unit regions being regions in which each of the plurality of objects has been captured; preliminary grouping circuitry, which in operation, forms a preliminary group including one or more second capture regions that are present within a determined range from each of the plurality of first capture regions; feature quantity acquisition circuitry, which in operation, calculates, on the basis of the measurement information, a feature quantity that represents an association between the preliminary group and each of the one or more second capture regions; discrimination circuitry, which in operation, discriminates, on the basis of the feature quantity, a type of each of the plurality of objects that belongs to each of the one or more second capture regions; and object determination circuitry, which in operation, that groups each of the one or more second capture regions according to the type of each of the plurality of objects to detect each of the plurality of objects.

An object detection apparatus according to a second aspect of the present disclosure is directed to the object detection apparatus according to the first aspect of the present disclosure, wherein the radar apparatuses each generate the measurement information for every determined frame, the object detection apparatus including tracking circuitry, which in operation, performs a tracking process on the preliminary group of a current frame on the basis of a result of the discrimination of the type of each of the plurality of objects in a previous frame, wherein the feature quantity acquisition circuitry acquires the feature quantity of the current frame on the basis of the measurement information and a result of the tracking performed by the tracker.

An object detection apparatus according to a third aspect of the present disclosure is directed to the object detection apparatus according to the first aspect of the present disclosure, wherein in a case where the one or more radar apparatuses are two or more radar apparatuses, the capture region extraction circuitry extracts the plurality of first capture regions on the basis of the measurement information acquired from each of the two or more radar apparatuses, the preliminary grouping circuitry forms the preliminary group for each of the two or more radar apparatuses, and the object detection apparatus comprising preliminary group integration circuitry, which in operation, integrates, onto an identical coordinate system, the preliminary group corresponding to each of the two or more radar apparatuses.

An object detection apparatus according to a fourth aspect of the present disclosure is directed to the object detection apparatus according to the first aspect of the present disclosure, wherein the discriminator includes: degree-of-certainty calculation circuitry, which in operation, calculates a degree of certainty on the basis of the feature quantity, the degree of certainty indicating a degree to which each of the one or more second capture regions belongs to each separate candidate for types of the plurality of objects; and maximum-degree-of-certainty calculation circuitry, which in operation, determines that each of the one or more second capture regions belongs to that one of the candidates for the types of the plurality of objects which is largest in the degree of certainty.

An object detection apparatus according to a fifth aspect of the present disclosure is directed to the object detection apparatus according to the first aspect of the present disclosure, wherein the feature quantity includes a feature quantity of each of the one or more second capture regions included in the preliminary group.

An object detection apparatus according to a sixth aspect of the present disclosure is directed to the object detection apparatus according to the first aspect of the present disclosure, wherein the feature quantity includes a feature quantity pertaining to a comparison between the preliminary group and each of the one or more second capture regions.

An object detection apparatus according to a seventh aspect of the present disclosure is directed to the object detection apparatus according to the first aspect of the present disclosure, wherein the feature quantity includes a feature quantity of each of the second capture regions and a feature quantity of a third capture region near the second capture regions.

An object detection apparatus according to an eighth aspect of the present disclosure is directed to the object detection apparatus according to the second aspect of the present disclosure, wherein the feature quantity includes an amount of variation in the feature quantity pertaining to the preliminary group between the previous frame and the current frame.

An object detection apparatus according to a ninth aspect of the present disclosure is directed to the object detection apparatus according to the first aspect of the present disclosure, including a model storage which in operation, stores an identification model obtained by modeling the plurality of objects according to the feature quantity, wherein the discriminator compares the feature quantity calculated by the feature quantity acquirer with the identification model stored in the model storage to discriminate types of the plurality of objects that belong to each of the one or more second capture regions.

An object detection method according to a tenth aspect of the present disclosure includes: receiving measurement information generated by one or more radar apparatuses using a plurality of reflected waves from each of a plurality of objects; using the measurement information to extract a plurality of second unit regions as a plurality of first capture regions from among a plurality of first unit regions, the plurality of first unit regions being regions into which a measuring range of the one or more radar apparatuses has been divided at every determined distance and every determined azimuth angle, the plurality of second unit regions being regions in which each of the plurality of objects has been captured; forming a preliminary group including one or more second capture regions that are present within a determined range from each of the plurality of first capture regions; calculating, on the basis of the measurement information, a feature quantity that represents an association between the preliminary group and each of the one or more second capture regions; discriminating, on the basis of the feature quantity, a type of each of the plurality of objects that belongs to each of the one or more second capture regions; and grouping each of the one or more second capture regions according to the type of each of the plurality of objects to detect each of the plurality of objects.

The present disclosure is applicable to an object detection apparatus that detects an object by using a result of a measurement made by a radar apparatus.

What is claimed is:

1. An object detection apparatus comprising:
   capture region extraction circuitry, which in operation, receives measurement information generated by one or more radar apparatuses using a plurality of reflected waves from each of a plurality of objects and uses the measurement information to extract a plurality of second unit regions as a plurality of first capture regions from among a plurality of first unit regions, the plurality of first unit regions being regions into which a measuring range of the one or more radar apparatuses has been divided at every determined distance and every determined azimuth angle, the plurality of second unit regions being regions in which each of the plurality of objects has been captured;
   preliminary grouping circuitry, which in operation, forms a preliminary group including a plurality of second capture regions present within a determined range from one of the plurality of first capture regions, regardless of whether the second capture regions belong to a same object or not;
   feature quantity acquisition circuitry, which in operation, calculates, based on the measurement information, a feature quantity that represents an association between the preliminary group and each of the plurality of second capture regions;
   discrimination circuitry, which in operation, discriminates, based on the feature quantity, a type of each of the plurality of objects that belongs to each of the plurality of second capture regions; and
   object determination circuitry, which in operation, groups each of the plurality of second capture regions according to the type of each of the plurality of objects to detect each of the plurality of objects.

2. The object detection apparatus according to claim 1, wherein the radar apparatuses each generate the measurement information for every determined frame,
   the object detection apparatus comprising tracking circuitry, which in operation, performs a tracking process on the preliminary group of a current frame based on a result of the discrimination of the type of each of the plurality of objects in a previous frame,
   wherein the feature quantity acquisition circuitry acquires the feature quantity of the current frame based on the measurement information and a result of the tracking performed by the tracking circuitry.

3. The object detection apparatus according to claim 1, wherein in a case where the one or more radar apparatuses are two or more radar apparatuses, the capture region extraction circuitry extracts the plurality of first capture regions based on the measurement information acquired from each of the two or more radar apparatuses,
   the preliminary grouping circuitry forms the preliminary group for each of the two or more radar apparatuses, and
   the object detection apparatus comprising preliminary group integration circuitry, which in operation, integrates, onto an identical coordinate system, the preliminary group corresponding to each of the two or more radar apparatuses.

4. The object detection apparatus according to claim 1, wherein the discriminator includes:
   degree-of-certainty calculation circuitry, which in operation, calculates a degree of certainty based on the feature quantity, the degree of certainty indicating a degree to which each of the plurality of second capture regions belongs to each separate candidate for types of the plurality of objects; and
   maximum-degree-of-certainty calculation circuitry, which in operation, determines that each of the plurality of second capture regions belongs to that one of the candidates for the types of the plurality of objects which is largest in the degree of certainty.

5. The object detection apparatus according to claim 1, wherein the feature quantity includes a feature quantity of each of the plurality of second capture regions included in the preliminary group.

6. The object detection apparatus according to claim 1, wherein the feature quantity includes a feature quantity pertaining to a comparison between the preliminary group and each of the plurality of second capture regions.

7. The object detection apparatus according to claim 1, wherein the feature quantity includes a feature quantity of each of the second capture regions and a feature quantity of a third capture region near the second capture regions.

8. The object detection apparatus according to claim 1, wherein the feature quantity includes an amount of variation in the feature quantity pertaining to the preliminary group between the previous frame and the current frame.

9. The object detection apparatus according to claim 1, comprising a model storage, which in operation, stores an identification model obtained by modeling the plurality of objects according to the feature quantity,
wherein the discrimination circuitry compares the feature quantity calculated by the feature quantity acquirer with the identification model stored in the model storage to discriminate types of the plurality of objects that belong to each of the plurality of second capture regions.

10. An object detection method comprising:
receiving measurement information generated by one or more radar apparatuses using a plurality of reflected waves from each of a plurality of objects;
using the measurement information to extract a plurality of second unit regions as a plurality of first capture regions from among a plurality of first unit regions, the plurality of first unit regions being regions into which a measuring range of the one or more radar apparatuses has been divided at every determined distance and every determined azimuth angle, the plurality of second unit regions being regions in which each of the plurality of objects has been captured;
forming a preliminary group including a plurality of second capture regions that are present within a determined range from one of the plurality of first capture regions, regardless of whether the second capture regions belong to the same object or not;
calculating, based on the measurement information, a feature quantity that represents an association between the preliminary group and each of the plurality of second capture regions;
discriminating, based on the feature quantity, a type of each of the plurality of objects that belongs to each of the plurality of second capture regions; and
grouping each of the plurality of second capture regions according to the type of each of the plurality of objects to detect each of the plurality of objects.

11. The object detection apparatus according to claim 6, wherein the feature quantity is a difference in center azimuth value or center distance value between the second capture region and the preliminary group, or a ratio of azimuth width or distance width between the second capture region and the preliminary group.

* * * * *